July 19, 1927.

F. E. BESSLER

MOVABLE STAIRWAY

Filed Nov. 19, 1925

1,636,281

2 Sheets-Sheet 1

F. E. Bessler
Inventor
By C.A.Snow & Co.
Attorneys.

July 19, 1927.  1,636,281

F. E. BESSLER

MOVABLE STAIRWAY

Filed Nov. 19, 1925  2 Sheets-Sheet 2

F. E. Bessler
Inventor

By C. A. Snow & Co.
Attorneys

Patented July 19, 1927.

1,636,281

UNITED STATES PATENT OFFICE.

FRANK E. BESSLER, OF AKRON, OHIO.

MOVABLE STAIRWAY.

Application filed November 19, 1925. Serial No. 70,145.

This invention aims to provide novel means for supporting a stairway slidably with respect to a vertically movable panel, and, within the scope of what is claimed, a mechanic may make changes without departing from the spirit of the invention.

Figure 1:
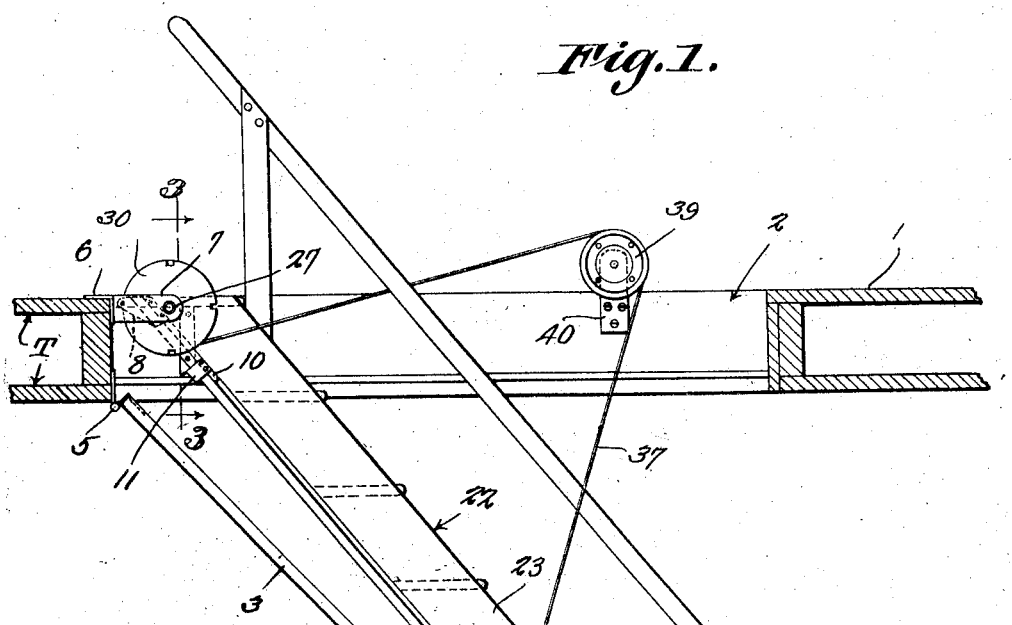
Figure 2:
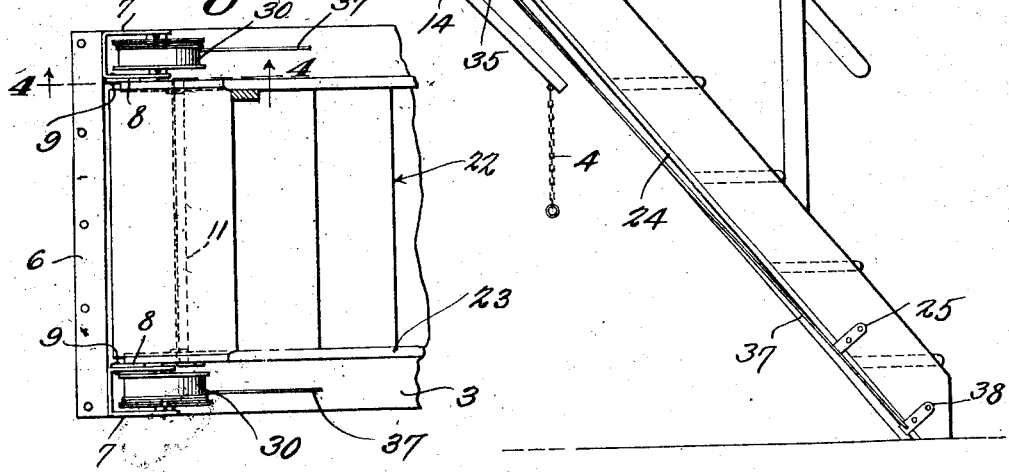
Figure 3:
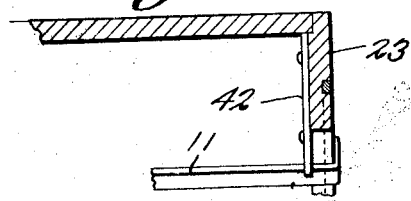
Figure 4:
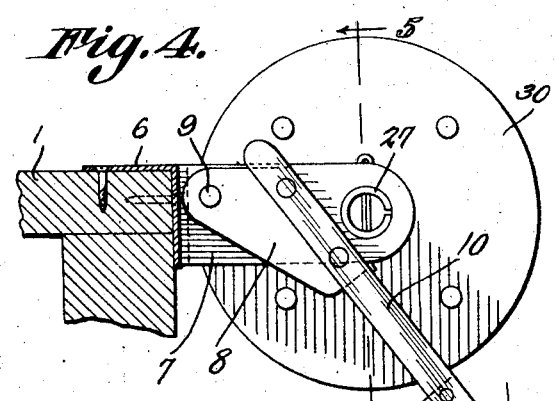
Figure 5:
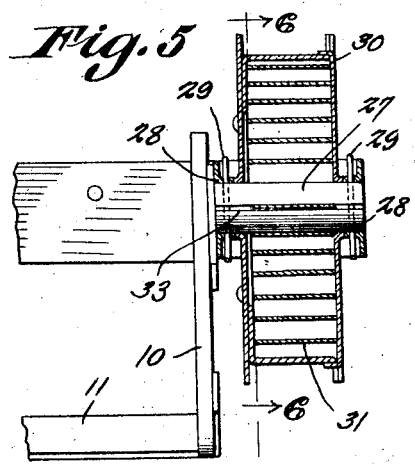
Figure 6:
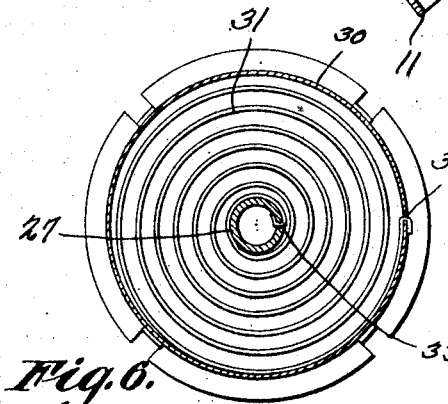
Figure 7:
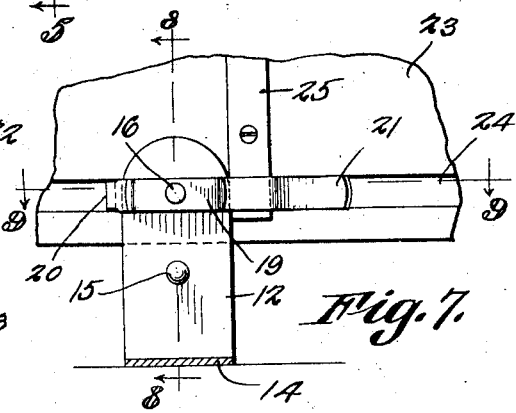
Figure 8:
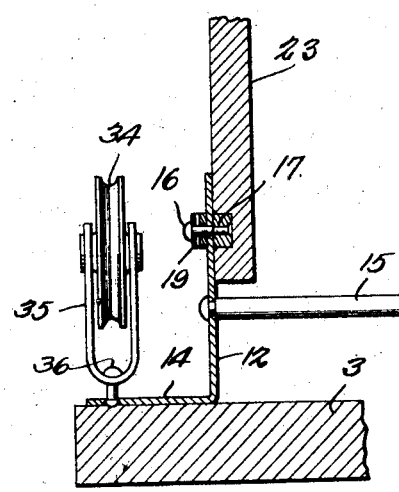
Figure 9:
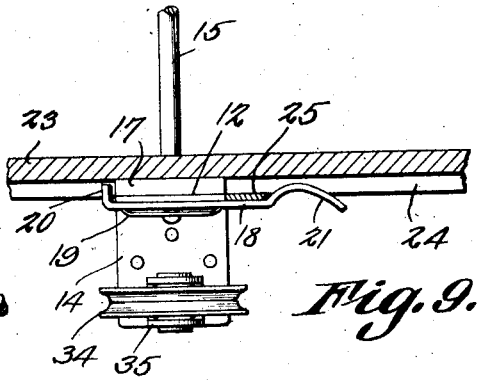

Figure 1 shows in side elevation, a device constructed in accordance with the invention, the panel being swung down and the stairway being lowered; Figure 2 is a fragmental plan of the stairway and panel; Figure 3 is a section on the line 3—3 of Figure 1; Figure 4 is a section on the line 4—4 of Figure 2; Figure 5 is a section on the line 5—5 of Figure 4; Figure 6 is a section on the line 6—6 of Figure 5; Figure 7 is an elevation showing part of the guiding means for the stairway; Figure 8 is a section on the line 8—8 of Figure 7; Figure 9 is a section on the line 9—9 of Figure 7.

The numeral 1 marks a support, which may be the ceiling of a room, the same having an opening 2 controlled by a vertically swinging panel 3 hingedly mounted at 5 on the support 1 and adapted to be pulled down by any suitable means 4. An angle bracket 6 is mounted on the support 1 at one end of the opening 2 and carries horizontally projecting two-armed hangers 7. Arms 8 are pivoted at 9 to the inner sides of the hangers 7 and carry elongated guide bars 10 connected by a depending, rigid, U-shaped strip 11.

Standards 12 are erected on the panel 3 near to the lower end thereof, and have laterally projecting horizontal feet 14, the standards being connected by a cross rod 15. A pivot element 16 is mounted to turn in each standard 12. A guide 17, in the form of an elongated block, is mounted on the inner end of the pivot element 16. Latches 18 are mounted on the outer ends of the pivot elements 16, and each latch is pressed frictionally against the standard 12 by a spring 19, mounted on the pivot element 16, and having inturned ends engaging the latch 18. The latch 18 can swing vertically on the pivot element 16, for adjustment. The rear ends of the latches 18 have inwardly extended fingers 20. The forward ends of the latches 18 are supplied with inclined heads 21.

A stairway 22 slides longitudinally of the panel 3 and includes stiles 23 having longitudinal grooves 24 wherein the guide bars 10 of the arms 8, and the guide blocks 17 of the standards 12, are slidably received. Keepers 25 are mounted on the stiles 23 of the stairway 22, near to the lower end of the stairway. Downwardly projecting bars 42 are secured to the inner surface of the stiles 23 of the stairway at the upper end of the stairway. The stairway carries one or more side rails 26.

Outwardly extended hollow shafts 27 are mounted in inwardly projecting hubs 28 on the hangers 7 and are held in the hubs by cotter pins 29. Drums 30 are located between the arms of the hangers 7 and are mounted on the shafts 27. Torsion springs 31 are disposed within the drums 30, the outer ends of the torsion springs being connected to the drums at 32, and the inner ends of the springs being connected at 33 to the shafts 27. Sheaves 34 are journaled on U-shaped supports 35 having stems 36 swiveled in the feet 14 of the standards 12. Flexible elements 37 are connected by anchors 38 to the stiles 23 of the stairway 22, near to the lower end of the stairway. The flexible elements 37 extend backwardly along the stairway, around the sheaves 34, upwardly around pulleys 39 journaled on posts 40 carried by the support 1, and, as shown in Figures 1 and 2, the rear ends of the flexible elements 37 are wound about the drums 30 and are connected thereto.

The general operation of the device may be dismissed with the statement that the panel 3 is swung down on its hinge 5 by the means indicated at 4, the stairway 22 being slid downwardly on the panel, the flexible element 37 rotating the drums 30, the springs 31 being put under torsion, and the springs reacting to aid in the backward sliding movement of the stairway 22, and in the upward swinging movement of the panel 3. When the stairway 22 is pulled downwardly to the limit, the depending bars 42 on the stiles of the stairway, cooperating with the stop element 11 that connects the guide bars 10, limit the downward movement of the stairway. When the stairway is slid upwardly to the limit, the keepers 25 engage with the heads 21 of the latches 18 to hold the stairway retracted, and abut against the standards 12.

Especial attention is directed to the pivotal mounting of the guide blocks 17 and 10. This construction permits the stairway 22 to be disposed at any desired acute angle to the panel 3, governed by the vertical thickness of the support 1, indicated by the letter T in Figure 1. The fingers 20 on the latches 18, being received in the longitudinal grooves 24 of the stiles 23 of the stairway, hold the latches 18 longitudinally of the stairway, so that they will engage with the keepers 25, but because the latches are pivotally mounted, they will adjust themselves to the angle between the stairway 22 and the panel 3, as regulated by the thickness of the support 1, shown at T.

What I claim is:

1. In a device of the class described, a support, a panel hinged to the support, a stairway slidable longitudinally of the panel and having a longitudinal groove, a standard on the panel, a guide block pivoted to the standard and received slidably in the groove, a hanger on the support, an arm pivoted to the hanger, a guide carried by the arm and received slidably in the groove, means for lifting the panel and the stairway and including a spring drum and a flexible element connected to the drum, the panel and the stairway; and a latch mounted pivotally on the standard and comprising a part received in the groove to hold the latch disposed longitudinally of the stairway, a keeper on the stairway and co-operating with the latch to hold the stairway retracted, and an anti-rattling spring supported by the standard and holding the latch frictionally against the standard.

2. In a device of the class described, a support, a panel hinged to the support, a stairway slidable longitudinally of the panel and having a longitudinal groove, a standard on the panel, a guide block pivoted to the standard and received slidably in the groove, a hanger on the support, an arm pivoted to the hanger, a guide bar carried by the arm and received slidably in the groove, a spring-actuated drum on the hanger, a flexible element connected at its ends to the drum and to the stairway, means for carrying the flexible element intermediate its ends on the support, a pulley receiving the intermediate portion of the flexible element, and means for mounting the pulley for swinging swiveled movement on the standard.

3. In a device of the class described, a support, a panel, hinged to the support, a stairway slidable longitudinally of the panel and having longitudinal grooves, standards on the panel, guide blocks pivoted to the standards respectively and received slidably in the grooves, hangers mounted on the support, arms pivoted to the hangers respectively guide bars carried by the respective arms and received slidably in the grooves, a connecting element uniting the guide bars and extending beneath the stairway, a depending member on the stairway and co-operating with the connecting element to limit the downward sliding movement of the stairway with respect to the panel, and means for lifting the panel and stairway and including spring drums and flexible elements secured to the drums respectively the panel and the stairway.

4. In a device of the class described a support, a panel hinged to the support, a standard on the panel, a stairway slidable longitudinally of the panel on the standard and having a longitudinal groove, a keeper on the stairway, and a latch pivotally mounted on the standard and comprising a part received in the groove to hold the latch disposed longitudinally of the stairway and in such position as to engage with the keeper, to hold the stairway retracted.

In testimony that I claim the foregoing as my own, I have hereto affixed my signature.

FRANK E. BESSLER.